United States Patent [19]

Lehmann

[11] Patent Number: 5,497,654

[45] Date of Patent: Mar. 12, 1996

[54] METHOD AND APPARATUS FOR LEAK TESTING A CONTAINER

[76] Inventor: Martin Lehmann, Obere, Farnbuhlstr. 1, CH-5610 Wohlen, Switzerland

[21] Appl. No.: 154,079

[22] Filed: Nov. 18, 1993

Related U.S. Application Data

[63] Continuation-in-part of Ser. No. 15,839, Feb. 10, 1993, Pat. No. 5,333,491, which is a continuation of Ser. No. 696,917, May 8, 1991, Pat. No. 5,199,296, which is a continuation-in-part of Ser. No. 469,398, Jan. 24, 1990, Pat. No. 5,042,291.

[30] Foreign Application Priority Data

Jan. 27, 1989 [DE] Germany ............ 39 02 435.0

[51] Int. Cl.⁶ .................................... G01M 3/32
[52] U.S. Cl. .................................... 73/49.3; 73/52
[58] Field of Search .................. 73/49.3, 45.4, 73/52, 40.7

[56] References Cited

U.S. PATENT DOCUMENTS

| | | | |
|---|---|---|---|
| 2,011,332 | 8/1935 | Chapman | 73/45.4 |
| 3,091,114 | 5/1963 | Webster | 73/49.3 |
| 3,177,704 | 4/1965 | Stange | 73/49.3 |
| 3,813,923 | 6/1974 | Pendleton | 73/49.2 |
| 4,593,554 | 6/1986 | Aarts | 73/49.3 |
| 4,706,494 | 11/1987 | Creed et al. | 73/49.3 |
| 4,715,215 | 12/1987 | Perhach et al. | 73/49.3 |
| 4,747,299 | 5/1988 | Fox et al. | 73/49.3 |
| 4,774,830 | 10/1988 | Hulsman | 73/49.3 |
| 4,791,805 | 12/1988 | Gates | 73/40.7 |
| 4,862,732 | 9/1989 | Raymond et al. | 73/45.4 |
| 4,899,574 | 2/1990 | Potteiger | 73/49.3 X |
| 4,905,501 | 3/1990 | Sawatani | 73/40 |
| 4,934,180 | 6/1990 | Hulsman | 73/49.3 |
| 5,029,463 | 7/1991 | Schvester et al. | 73/45.4 X |
| 5,042,291 | 8/1991 | Lehmann | 73/49.3 |
| 5,150,605 | 9/1992 | Simpson | 73/49.3 |
| 5,199,296 | 4/1993 | Lehmann | 73/49.3 |

FOREIGN PATENT DOCUMENTS

| | | |
|---|---|---|
| 0432550 | 11/1990 | European Pat. Off. . |
| 0577454 | 1/1994 | European Pat. Off. ............ 73/49.3 |
| 395584 | 7/1965 | Germany . |
| 2218194 | 4/1972 | Germany . |
| 246648 | 11/1986 | Japan ............................... 73/49.2 |
| 137534 | 6/1987 | Japan ............................... 73/49.3 |
| 206231 | 8/1989 | Japan ............................... 73/49.3 |
| 156334 | 7/1991 | Japan ............................... 73/49.3 |
| 385584 | of 0000 | Switzerland . |
| 157820 | 10/1963 | U.S.S.R. ................................ 73/52 |

OTHER PUBLICATIONS

English Abstract of Japanese 58–34337 dated Feb. 1983.
Japanese Abstract of vol. 7, 113 (p. 197), 18 Apr. 1983.

Primary Examiner—Hezron E. Williams
Assistant Examiner—J. David Wiggins
Attorney, Agent, or Firm—Antonelli, Terry, Stout & Kraus

[57] ABSTRACT

A method and test chamber for leak testing a container with substantially flexible side wall wherein the container is introduced into a test cavity so that the flexible side wall of the container is spaced from at least first, relatively recessed portions of an inner adjacent wall of the test cavity with a gap being defined between at least the first, relatively recessed portions of the inner wall of the test cavity and the flexible side wall of the container. A pressure difference is installed as an initial value between the interior of the container and at least the gap by applying a pressure at least to the gap which is smaller than a pressure inside the container. The flexible side wall is supported from its exterior side within the test cavity on second, relatively raised portions of the adjacent inner wall of the test cavity so as to mechanically stabilize the flexible side wall with respect to the outward bending as a result of the pressure difference. The time course of a pressure prevailing within the gap is measured as a leak indicative signal. The volume of the container can be reduced during testing by mechanically biasing the container from the outside to receive the pressure inside the container during testing and to additional stress selected areas of the container.

34 Claims, 4 Drawing Sheets

METHOD AND APPARATUS FOR LEAK TESTING A CONTAINER

RELATED APPLICATIONS

This application is a continuation-in-part of U.S. application Ser. No. 08/015,839 filed Feb. 10, 1993, now U.S. Pat. No. 5,333,491 issued Aug. 2, 1994, which in turn is a continuation of U.S. application Ser. No. 07/696,917 filed May. 8, 1991, now U.S. Pat. No. 5,199,296 issued Apr. 6, 1993, which in turn is a continuation-in-part of U.S. application Ser. No. 469,398 filed Jan. 24, 1990, now U.S. Pat. No. 5,042,291 issued Aug. 27, 1991.

FIELD AND BACKGROUND OF THE INVENTION

The present invention relates in general to a method for leak testing of a container, to a test chamber therefor and to a test machine for in-line testing of such containers. More particularly, the present invention is directed to a method for reducing test cycle time and for improving the measuring accuracy of a leak testing process as well as to a test chamber and to a test machine with reduced test cycle time and improved measuring accuracy.

Methods for leak testing of containers are known in which a pressure difference is applied between the interior and the exterior of a container to be tested as an initial value for later measuring. Afterwards, the time course of a pressure value, which is dependent from the pressure difference installed as the initial value and from leakage conditions of the container to be tested, is measured, significant for leak conditions of the container under test.

Such a leak testing method is e.g. known from the German laid open print no. 24 47 578. This reference provides for a testing method to test the welding seam of such container with respect to leakage. Therefore such containers are pressure loaded inside and also outside, through an opening of the container to be tested. There is provided separately a test channel around the welding seam of the container and leakage is monitored by measuring the time course or timely development of pressure within said test channel. This measuring is indicative for leakage of the welding seam of the open container.

From the German laid open print no. 21 15 563 it is further known to test the seam of containers which are closed by a foil lid. Thereby, the bottom of the container is perforated by means of a needle-like end part of a pressure line, by which the inside of the container is pressurized. By monitoring the time course of the inside pressure of the container, an indication is provided indicative of tightness of the container.

From the article "Lecksuche mittels Differenzdruckmessungen" from J. T. Furness, VFI 4/78, it is generally known to test a container on leakage by monitoring its internal or its external pressure. Thereby it is described that the smaller that a volume is selected wherein the time course of pressure is monitored, the more accurate such a measuring will become.

There exists a clear need for shortening the time span necessitated for a test cycle of a container on one hand and of improving the accuracy of such tests to be able to detect the smallest leakages of such containers.

A method and test chamber for leak testing a container with a substantially flexible wall portion disclosed in applicants' earlier U.S. Pat. No. 5,042,291 offer a solution to the aforementioned need wherein the container is introduced into a test cavity so that the wall portion of the container is spaced from an inner adjacent wall portion of the test cavity with a gap being defined between the wall portion of the cavity and the flexible wall portion of the container. A pressure difference is installed as an initial value between the interior of the container and at least the gap by applying a pressure at least to the gap which is smaller than a pressure inside the container. The flexible wall portion of the container is supported from its exterior side within the test cavity using a grid or a mesh structured inlay to prevent the flexible wall portion from bending outwardly into contact with the wall portion of the test cavity as a result of the pressure difference. The time course of a pressure prevailing within the gap is measured as a leak indicative signal.

SUMMARY OF THE INVENTION

It is an object of the present invention to shorten the time span necessitated to leak test a container and to simultaneously improve the measuring accuracy for leak detection, thus leading to the possibility to detect significantly reduced leakages in shorter test time, without using a grid or mesh structured inlay in the test chamber to prevent the flexible side wall portion of the container from bending outwardly into contact with the wall portion of the test cavity as a result of a pressure difference between the interior of the container and the remaining volume of the test cavity.

A further object of the present invention is to leak test a container while selectively increasing stress on critical parts of the container, such as the flexible lid and where the lid is fixed to the container, e.g. by gluing or welding.

The first object referred to above is achieved by a method of leak testing a container with a flexible side wall according to the invention, which method comprises introducing the container into a cavity so that the flexible side wall of the container is spaced from at least first, relatively recessed portions of an adjacent inner wall of the test cavity with a gap being defined between at least the first, relatively recessed portions of the inner wall of the test cavity and the flexible side wall of the container, installing a pressure difference as an initial value between the interior of the container and at least the gap by applying at least to the gap a pressure which is smaller than a pressure inside the container, mechanically stabilizing the flexible side wall with respect to outward bending as a result of the pressure difference by supporting the flexible side wall from its exterior side within the test cavity on second, relatively raised portions of the adjacent inner wall of the test cavity and measuring the time course of a pressure prevailing within the gap as a leak indicative signal. In a disclosed embodiment of the invention, a plurality of channels are formed in the inner adjacent wall portion of the test cavity to form the first, relatively recessed portions and then second, relatively raised portions. Alternatively, or in addition to a plurality of channels, the inner adjacent wall portion of the test cavity can be roughened as by blasting the surface with objects to form at least some of the first, relatively recessed portions and second, relatively raised portions. In the disclosed embodiment of the method, the container is introduced into the cavity so that the flexible side wall of the container is spaced from both the first, relatively recessed portions of the inner adjacent wall of the test cavity and the second, relatively raised portions of the adjacent inner wall. Upon installation of the pressure difference, the flexible side wall of the container expands into contact with the second, relatively raised portions where it is mechanically stabilized with respect to further outward bending.

The method of the invention reduces a test cycle time and improves measuring accuracy in a leak testing process for a container through installing of a pressure difference between an interior of the container and the exterior thereof as an initial value. The leak testing process further comprises measuring of a time course of a pressure value which is dependent from the pressure value previously installed as said initial value and from leakage of the container under test. Measuring of the said pressure value results in a leak indicative measurement. Reducing of test cycle time and simultaneously improving measuring accuracy is realized by installing the pressure difference as the said initial value, in that a predetermined pressure is installed at the exterior of a closed container without its closed integrity being destroyed. As measuring of the time course of the said pressure value dependent from the pressure difference installed and from the container leakage, the time course of the pressure of the exterior of the closed container is measured.

Further, the volume of the exterior of the closed container at which the predetermined pressure is installed and at which the time course of the pressure is measured, is minimalized, in that the invention departs from the recognition that, for such closed container testing, one in the same volume is substantially determining test cycle time and measuring accuracy and that both may be optimized by minimalizing one in the same volume, namely said pressurized external volume of the container under test.

An inventive test chamber of the invention for leak testing a container with a flexible side wall comprises a closable test cavity with an inner wall within which a container to be leak tested can be positioned such that a flexible side wall of the container is spaced from at least first, relatively recessed portions of an adjacent portion of the inner wall, means for controllably reducing pressure within said cavity, means for measuring pressure within said cavity and wherein the adjacent portion of the inner wall of the test cavity further comprises second, relatively raised portions for supporting the flexible side wall of the container with respect to outward bending as a result of a reduced pressure within the cavity with respect to pressure within the container. In a preferred form of the invention the first, relatively recessed portions include a plurality of channels in the inner adjacent portion of the inner wall. The adjacent portion of the inner wall between the channels includes a roughened wall surface with relatively raised portions thereof forming at least some of the second, relatively raised portions and relatively recessed portions thereof forming at least some of the first, relatively recessed portions.

For improved test cycle time and measuring accuracy for a container which has a cross-sectional area diminishing along a direction of a transverse axis through the container, the test chamber comprises a closable test cavity having a shape which is selected to be at least substantially geometrically similar to the shape of the container, so as to minimize the remaining volume of the test cavity once the container is introduced therein for testing a closed container without destroying its closed integrity.

Another method of the invention for leak testing a container, closed with a flexible lid such as a foil-like lid, fixed to a projecting rim of the container, comprises the steps of disposing the closed container into a test receptacle, supporting the closed container within the receptacle, sealingly closing the receptacle with a test volume located between the container and the closed receptacle, establishing a pressure difference between the test volume and a pressure inside the container as an initial value, and monitoring a pressure prevailing within the test volume as a leak indicative signal, and wherein the method includes mechanically biasing the container from the outside to the inside by contacting the container with a body when the container is in the test receptacle to reduce the volume and increase the pressure inside the container and to apply additional stress to selected areas of the container. That is, the inside of the container is additionally pressurized and especially the air remaining therein beside the filling product, and critical parts of the overall container, namely the lid at its bonded seam, are extremely loaded so that such areas may be tested under a selectively increased stress. The body which mechanically biases the flexible lid of the container is a projection on a cover of the test receptacle in a disclosed embodiment of the invention.

A test chamber according to the invention for leak testing of a container in accordance with the aforementioned method of the invention where the container has a cross-sectional area diminishing along the direction of a transverse axis through the container, comprises a closable test cavity for receiving the container. The cavity is formed by a receptacle, the open cross-sectional area thereof diminishing in a direction towards the bottom of the receptacle. The closable test cavity includes a cover for tightly closing the receptacle. The test chamber further includes means for installing a pressure difference as an initial value between the inside of the container and the remaining volume of the test cavity, once the container is introduced therein. Further, means are provided for measuring a pressure value which is dependent from the pressure difference installed and leakage of the container. As a result of this test chamber, the shape of the cavity is at least substantially geometrically similar to the shape of the container, so as to minimize the remaining volume, and whereby the means for installing and the means for measuring communicate with the remaining volume so as to test a closed container without destroying its closed integrity. The cover of the closable test cavity is also formed with a projection on an inner wall thereof which biases a flexible lid of the container in the closed test cavity to pressurize the contents of the container.

The above and other objects of the present invention become more apparent as the description proceeds.

DESCRIPTION OF THE DRAWINGS

The above and other features of the present invention will be more readily understood when the following detailed description is considered in conjunction with the accompanying drawings, in which.

DETAILED DESCRIPTION

Figure 1:
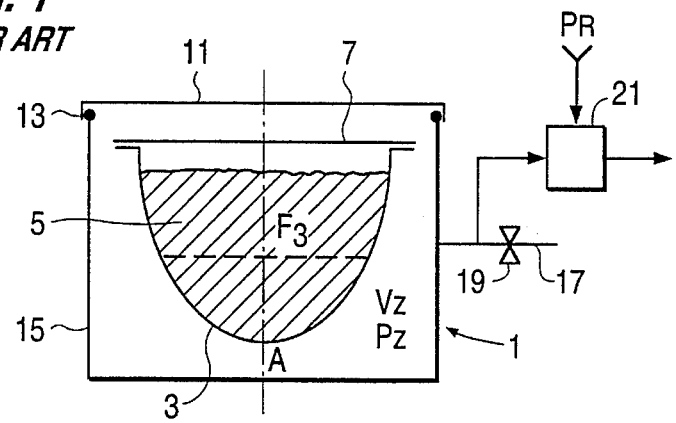
FIG. 1 shows schematically a prior art test chamber and its use for leak testing of closed and filled containers which containers have a diminishing cross-sectional area as seen in direction of a transverse container axis.

In FIG. 1 there is schematically shown a test chamber 1 for leak testing of closed containers 3, which, as seen in a direction of an axis A of the container, have a diminishing cross-sectional area $F_3$. The container 3 is filled with a filling material 5 and is e.g. closed by a covering foil-like lid 7. The foil-like lid 7 is fixed along its periphery to container 3, e.g. by gluing or welding. Such a container may be a plastic material cup closed by an aluminum foil 7.

For leak testing, such containers 3 are introduced into the test chamber 1 which then is hermetically closed by means of a cover 11 and a seal 13. Between the container 3 and the interior wall of the test chamber, which latter consists of the cover 11 and the chamber receptacle 15, there is defined a remaining volume $V_z$ which is pressurized by the test pressure $P_z$ which test pressure is different from the pressure inside the closed container 3.

This is realized, as may be seen schematically from FIG. 1, by means of a pressurizing feed line 17 with a valve 19. After pressurizing the remaining volume $V_z$ the valve 19 is closed and the time development of the pressure $P_z$ within the remaining volume $V_z$ is monitored, e.g. with the help of a pressure sensor 21, which is preferably a difference pressure sensor. There is led to one of the pressure inputs of the difference pressure sensor a reference pressure $P_R$, to the other of its inputs the pressure $P_z$ of the remaining volume $V_z$ which is on one hand dependent from the pressure previously installed before the valve 19 was shut and from leakage of the container 3.

If as testing pressure, a pressure is applied to the remaining volume $V_z$ which is lower than the pressure residing inside the container 3, then a leak of the container 3 will result, after shutting valve 19, in a rising pressure in the remaining volume $V_z$ because of the gas exchange stream out of container 3 through the leak of the container 3, into the volume $V_z$.

Inversely, a reduction of pressure in the remaining volume $V_z$ will be registered due to a leak of the container 3 if, as a test pressure, an initial pressure is applied to the remaining volume $V_z$ which is higher than the pressure residing inside the container To initially apply the test pressure $P_z$ to the remaining volume $V_z$ as an initial value for testing, a gas volume must be fed to or removed from the said remaining volume $V_z$, the amount of which being the larger, the bigger the said remaining volume $V_z$.

The amount of gas which has to be fed or removed as to install the test pressure $p_z$, as an initial value, directly influences the time span necessitated to reach the test pressure initial value, given a defined power of a pressurizing or evacuation source connected to the feeding line 17. The smaller that the remaining volume $V_z$ is selected, the smaller the time span for reaching a predetermined test pressure $P_z$ as said initial value will be.

Further, by a given leak and by a given initial test pressure $P_z$ and thus an initial, given pressure difference between pressure in the remaining volume $V_z$ and pressure in the interior of the container 3, the amount of gas flowing out of such leak per time unit is defined. Thus, a change of pressure within the remaining volume $V_z$ as a result of leakage will be larger the smaller that the said remaining volume $V_z$ is.

Figure 2:
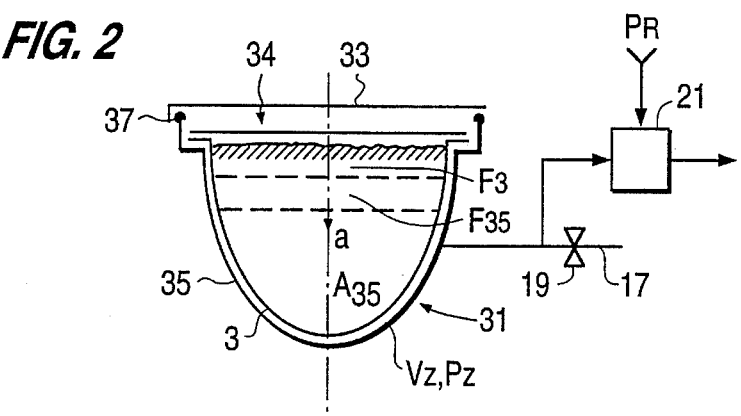
FIG. 2 shows schematically and in analogue representation to FIG. 1, an inventive test chamber realized according to the inventive method.

To optimally exploit these conditions as schematically shown in FIG. 2, the test chamber is tailored so that it defines together with an introduced container 3 to be tested, an optimally small remaining volume $V_z$.

The inventive test chamber 31, shown schematically in FIG. 2, comprises a one side open receptacle 35 with an opening 34, whereby cross-sectional areas $F_{35}$ of the receptacle 35, seen from the opening 34, continuously diminish. The diminution of the cross-sectional area $F_{35}$ along the axis $A_{35}$ preferably accords to the diminution of the cross-sectional area $F_3$ of a container 3 to be tested and to be therefore introduced into the test chamber 31. Thus, the wall of the container 3 and the inside wall of the test chamber 31 will be substantially equidistant, once such a container 3 is introduced into the test chamber 31. Thus, the remaining volume $V_z$ is minimalized.

The inventive test chamber 31 comprises a cover 33 which sealingly closes with schematically shown seals 37 the test chamber 31 after a container 3 to be tested has been introduced therein. Application of the initial test pressure and monitoring the time course of pressure at the remaining volume $V_z$ is realized the same way as was described for prior art test chambers and methods according to FIG. 1.

Figure 3:
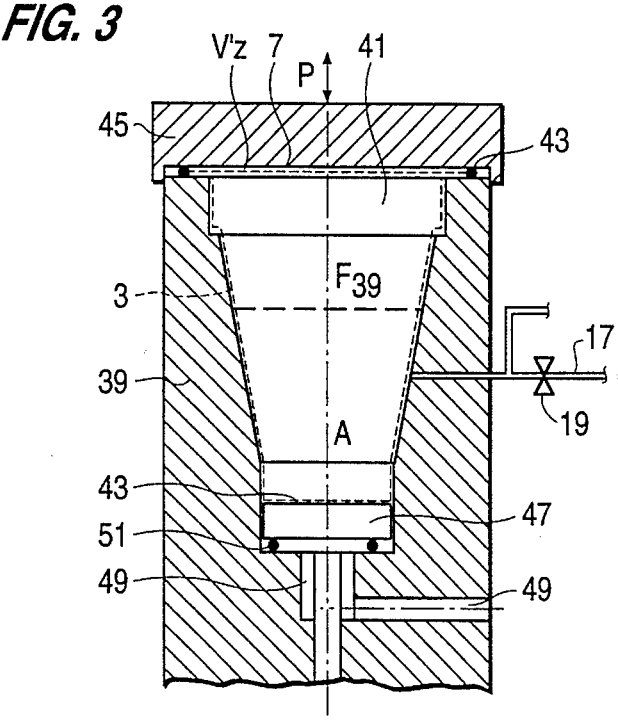
FIG. 3 shows schematically in a cross-sectional representation a preferred embodiment of an inventive test chamber for leak testing of cup shaped containers as of yogurt cups.

In FIG. 3 a preferred embodiment of an inventive test chamber is schematically shown. As an example it is constructed for testing closed containers 3 of substantially truncated cone form, as for testing yogurt cups, with respect to leakage. A container 3 to be tested, with a covering lid 7, is shown in dashed lines. The inventive test chamber comprises a receptacle 39 which is formed according to the outside form of the container 3. The cross-sectional area of the receptacle 39, $F_{39}$ diminishes in the direction of the central axis A substantially cone-like departing from a receptacle opening 41, towards the bottom 43 of the receptacle 39 and defines a cavity which is substantially similar in the sense of geometric similarity with the container 3, so that, when the container 3 to be tested is introduced, there are defined between its wall and the inside wall of the receptacle 39 substantially constant distances.

Adjacent to the opening 41 of the receptacle 39 there is preferably provided a positioning groove for a collar which is usually provided at such containers to which collar the covering foil-like lid of the container is welded (not shown).

The test chamber further comprises a cover 45 which is movingly driven as shown by reference P and is moved towards or from the receptacle 39, so as to either sealingly close it with the help of the seals 43 or to open it.

At the bottom of the receptacle 39 there is provided an axially movable and controllably driven piston 47 which is retracted, when a container 3 to be tested is introduced in the test chamber and during the testing of the container, and which, after opening the cover 45, is driven into the test chamber, so as to eject the tested container 3. The piston 47 comprises an enlarged piston head.

At the bottom of the receptacle 39, adjacent to the piston head, a drain sleeve 49 enters into the test chamber which is sealingly closed by means of the head of the piston 47 by means of seals 51, once the piston 47 is retracted. Thus, after testing a container 3 which was leaking, so that material contained in the container 3 could possibly penetrate into the test chamber, the test chamber may be rinsed after the piston 47 has been driven into the test chamber 31 to eject the leaking container 3. Thus, the test chamber 31 is rinsed and the rinsing liquid will be drained out of the open drain sleeve 49. For further improving rinsing of the test chamber, there may be provided, as at the cover 45, a rinsing liquid feed line, possibly with a nozzle arrangement, to eject rinsing liquid into the test chamber (not shown).

Preferably, and especially for use with containers which are closed by means of a covering foil 7, as yogurt cups etc., the test chamber is so arranged that its opening 41 points upwards. By this, one prevents filling material within container 3 from dropping on the covering lid which could lead to deterioration of leak testing and especially leak testing of the weld seam between covering lid 7 and the wall of the container, because the lid 7 would then be loaded by filling material to a condition not nominal.

The test chamber according to FIG. 3 comprises, as again schematically shown, pressure feed and pressure monitoring means as were described in connection with FIGS. 1 and 2.

For leak testing of containers, as of yogurt-, cream-, etc. cups, continuously in line with filling and closing operations for such containers, by which leak testing e.g. every container of the production shall be tested, a multitude of inventive test chambers, one of which having been described with the help of FIG. 3, are combined to form a test machine. In such a machine the multitude of test chambers according to FIG. 3 are preferably arranged on a turnably driven carousel table (not shown), so that, in line with filling and closing of the containers, all of them are pressure leak tested before these containers are stored ready for packaging. Especially for testing of containers with a flexible wall by means of applying under-pressure, areas of the container walls may be pressed on the inner wall of the test chamber. To prevent this it may be advisable to provide a mesh inlay along and slightly distant from the wall of the test chamber, so e.g. in the form of a cone-shaped mesh inlay which is open at its bottom end and in which the container 3 to be tested is introduced. Such a mesh inlay mechanically stabilizes the wall of the container 3 with respect to outward bending. Thus, with the help of such a mesh inlay it is prevented that the flexible container wall is bent so as to tightly reside on the inner wall of the test chamber when under-pressure is used as a test pressure in the remaining volume $V_z$. Possibly pressure equalizing connections are provided between the lower part of the receptacle 39 and the upper part adjacent to the cover 41 to ensure pressure equalization all around a container 3 to be tested, if a cover of the container tends to sealingly separate the lower part volume of the test chamber from the said upper part volume.

Such connections between lower and upper parts of the test chamber to provide for equalization of the pressure may be provided by appropriate grooves at the cover region of the test chamber, linking the lower part of the remaining volume $V_z$ with the upper part $V_z$ thereof.

Thus, providing a receptacle, the open cross-sectional area thereof diminishing in the direction towards the bottom of the receptacle and comprising a cover for tightly closing the receptacle, there is realized a most simple test chamber, from which a container 3, once tested, may be removed without any problems.

It must be pointed out that the above described provision of a grid or mesh structured inlay in the test chamber may also prevent a mechanically deformed wall of a container under test from sealingly shutting either an evacuation line for installing the initial test pressure and batting into the remaining volume $V_z$ or a measuring line for afterwards monitoring the time development of the pressure within the remaining volume.

Additionally, such a mechanical deformation of the container wall could lead to leakage of containers which would not occur if such a deformation is prevented as by the said mesh inlay.

Figure 4:
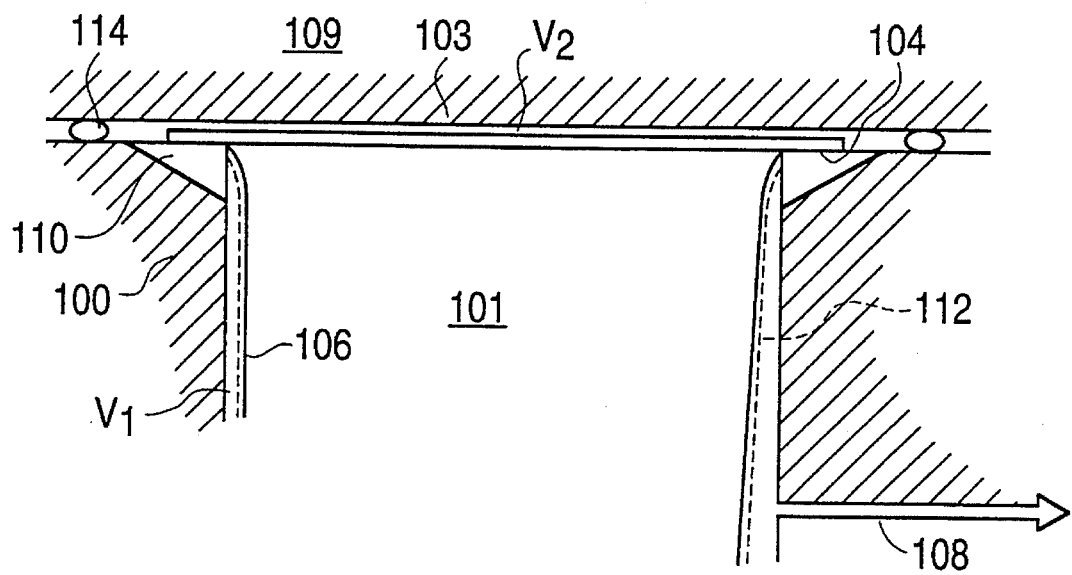
FIG. 4 shows a schematic cross-sectional view of a portion of a test chamber of the invention, which could be used in the test chamber of FIG. 3, wherein a plurality of grooves connect respective volumes $V_1$ and $V_2$ for pressure equalization.

In FIG. 4 there is shown an enlarged view of a test chamber which could be employed in the apparatus of FIG. 3, for example. The test chamber of FIG. 4 comprises a receptacle 100 containing a container 101 covered with a foil-like cover 103 which is, e.g., glued to a radially projecting rim portion 104 of the container 101, as is known, e.g., from yogurt containers. The rim portion 104 is supported on the border of a cavity defined within receptacle 100. The cavity defines, with respect to a flexible wall 106 of the container, a first test volume $V_1$. This volume $V_1$ is connected to a line 108 to apply pressure. A cover 109 closes the cavity of receptacle 100 and forms a second test volume $V_2$ over the container 101, so that the volumes $V_1$ and $V_2$ are interconnected by bypassing pressure connections 110 in the form of a plurality of spaced grooves. A cone-shaped mesh inlay 112, shown in dotted line, is provided for use with a pressure in the test volume, smaller than that within the container. The mesh inlay 112 is open at its bottom end and slightly distant from the wall of the test chamber. The mesh inlay stabilizes the flexible wall 106 of the container with respect to outward bending as discussed above in reference to FIG. 3.

Figure 5:
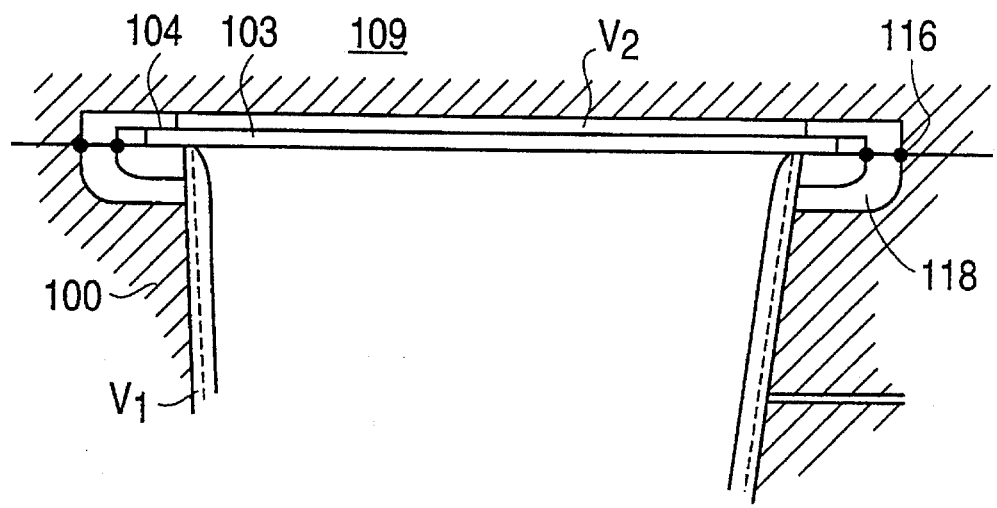
FIG. 5 shows a schematic, cross-sectional view of a portion of a test chamber according to another embodiment of the invention.

Another embodiment of the present invention is shown in FIG. 5 where sealing of the cover 109 with respect to the cavity defined within receptacle 100 is not performed by a special sealing as sealing ring 114 of FIG. 4, but is provided by pressurizing the rim portion 104 between the cover 109 and the border of receptacle 100. Thus, in this embodiment small sealing rings 116 are provided to just seal respective connecting lines 118 communicating the respective volumes $V_1$ and $V_2$. This embodiment could also be used upside down.

Figure 6:
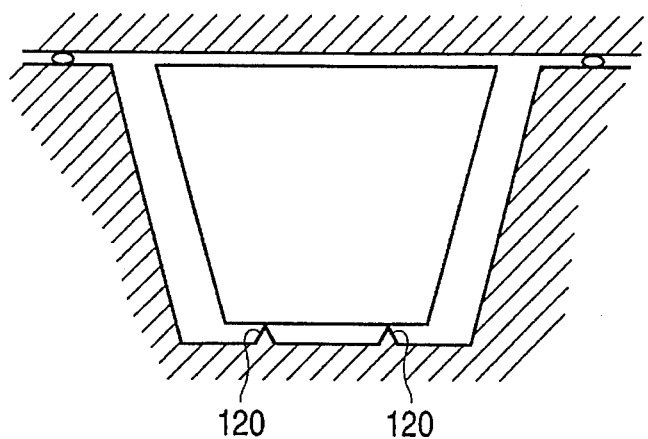
FIG. 6 shows a schematic, cross-sectional view of another feature of a test chamber of the invention which can be used in any of the other embodiments.

By the technique illustrated in FIG. 6 it becomes possible to surround the complete container to be tested by test volume and test pressure without any standing area for such container blocking a portion of the container. Thus, in a more general view, it would suffice to deposit the container to be tested at distinct points 120, as schematically shown in FIG. 6 to allow all around pressurizing. The feature of the test chamber and method of the invention could be employed with the mesh inlay of previous embodiments to stabilize the flexible side wall of the container.

Figure 7:
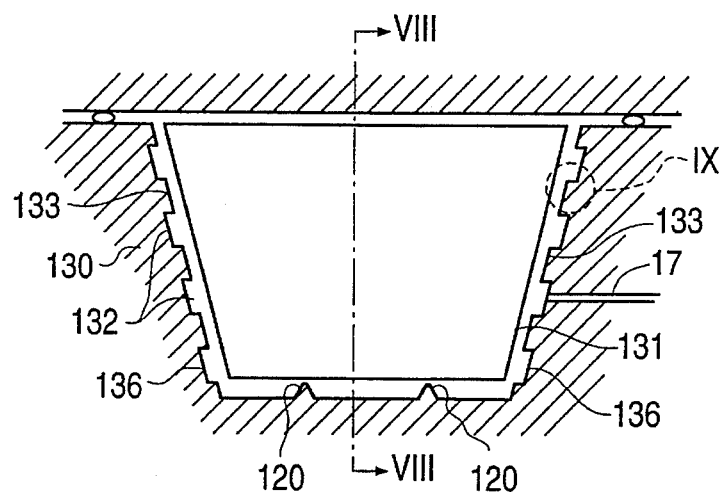
FIG. 7 shows a schematic, cross-sectional view of another test chamber of the invention, which could be used in the test chambers of FIGS. 4, 5, 6 and 10 instead of providing a grid or mesh structured inlay, and wherein the inner wall of the test cavity is formed with a plurality of channels which form first, relatively recessed portions and second, relatively raised portions.
Figure 8:
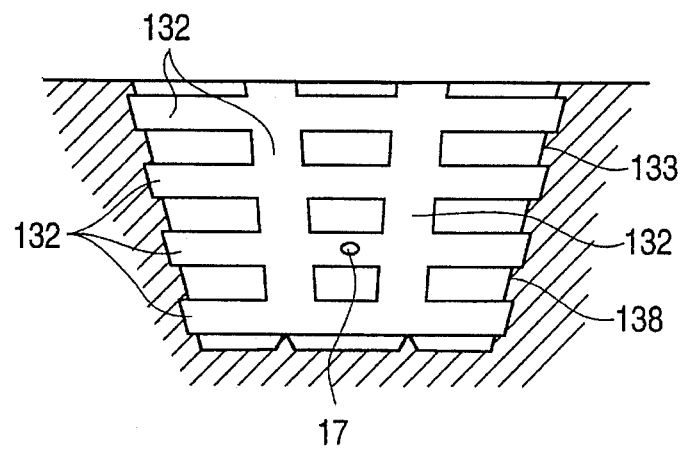
FIG. 8 is a schematic cross-sectional view of the test chamber of FIG. 7 taken along the line VIII—VIII therein with the container in FIG. 7 not being shown so that the longitudinally extending, intersecting horizontal and vertical channels forming the first, relatively recessed portions and the second, relatively raised portions can be seen.
Figure 9:
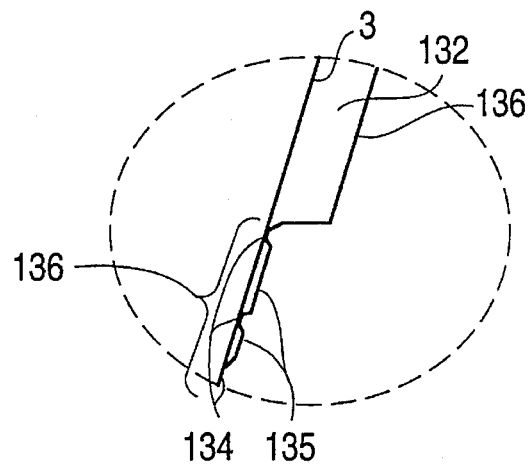
FIG. 9 is an enlarged view of the portion of the test chamber of FIG. 7 within the dashed line circle IX depicting a roughened surface on a relatively raised portion of the inner wall between the channels therein.

Instead of employing a mesh inlay for mechanically stabilizing the flexible side wall of the container with respect to outward bending as a result of a pressure difference between the inside of the container and the remaining volume of the test cavity as described with respect to the aforementioned embodiments, according to the test chamber and method of a further embodiment of the invention, as depicted in FIGS. 7–9, at least portions of the wall of the test chamber itself are structured to, on one hand, support the flexible side wall of the container with respect to the outward bending as a result of a reduced pressure within the cavity with respect to pressure within the container, and on the other hand, maintain a spacing between the flexible side wall of the container and at least first, relatively recessed portions of the adjacent wall of the test cavity with a gap being defined between at least the first, relatively recessed portions of the inner wall of the test cavity and the flexible side wall such that a pressure difference can be installed between the interior of the container and at least the gap by applying a pressure at least to the gap which is smaller than the pressure inside the container. This structure of at least portions of the wall of the test chamber itself may be realized by mechanically machining of channels, bores and so on into the test chamber wall by milling, drilling, eroding, etc. A second possibility is to increase roughness of the surface of at least preselected areas of the test cavity wall. This may be done by, for example, sand blasting or blasting with glass bullets. The two techniques of mechanically machining and of surface structure roughening may be used individually or may be combined selectively for predetermined test chamber surface areas as in the embodiment of FIGS. 7–9.

More particularly, in the embodiment of FIGS. 7–9 there is disclosed a test chamber of the invention which could be used in the test chamber of FIGS. 3, 4, 5, 6 or 10. The test chamber of FIGS. 7–9 comprises a receptacle 130 wherein at least portions of the wall 131 of the receptacle are structured by machining a plurality of channels 132 therein which extend vertically and horizontally. The channels intersect with one another as seen in FIG. 8. A pressurizing feed line 17 extends from the bottom of one of the channels 132 as shown in FIG. 7. Because the channels intersect with one another, the pressure installed in the test cavity about the container therein is communicated about the container by way of the interconnected channels 132 even though a flexible side wall of the container may expand outwardly into contact and be supported by relatively raised portions 133 of the wall located between the channels.

According to a further feature of the invention, the surface of the relatively raised portions 133 can optionally be roughened as by sand blasting or blasting the inner wall of the test cavity with glass bullets to provide relatively raised portions 134 and relatively recessed portions 135 in the relatively raised portions 133 as shown in FIG. 9. With such a roughened surface, the flexible side wall of the container can be supported on the high points, that is the relatively raised portions 134 of raised portions 133, while permitting a pressure difference installed in the channels 132 to be communicated with the side wall of the container opposite raised portions 133 therein by way of the relatively recessed portions 135 therein caused by roughening the surface of the raised portions 133. The roughening procedure of the test cavity inside wall can be accomplished over the entire wall prior to machining of the channels 132. The relatively recessed portions 136 of the wall 131 formed by the channels 132, e.g. the bottom of the channel 132, need not be roughened as the flexible side wall of the container will be supported outwardly therefrom on raised portions 133 to mechanically stabilize the flexible side wall with respect to further outward bending as a result of an installed pressure difference.

Figure 10:
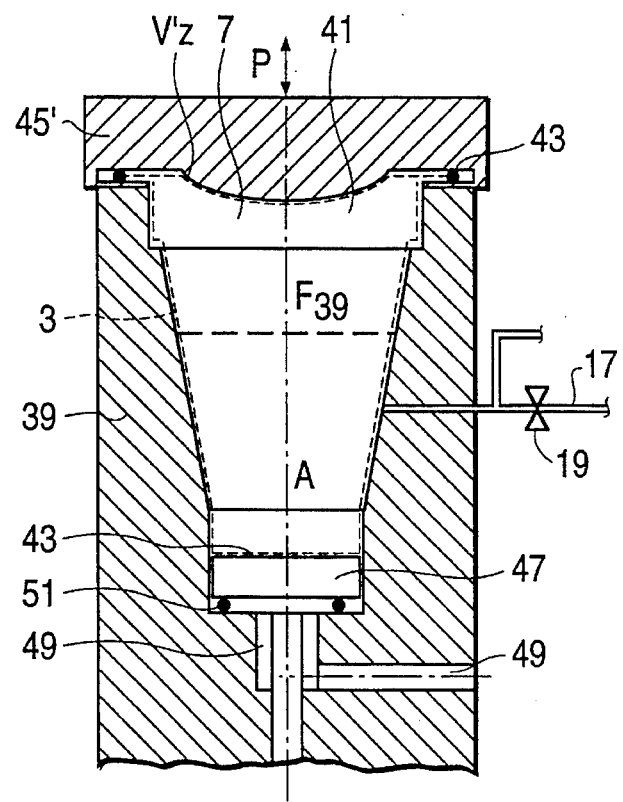
FIG. 10 shows schematically in a cross-sectional representation another embodiment of an inventive test chamber for leak testing of cup-shaped containers such as yogurt cups.

A test chamber and method for leak testing a container according to a still further embodiment of the invention involves reducing the inside volume of the container during testing by mechanically biasing at least a flexible portion of the container from the outside to the inside thereby increasing the pressure within the container and applying additional stress to selected areas of the container. In a disclosed form of this embodiment, as illustrated in FIG. 10, the test chamber is like that shown in FIG. 3 except that the cover $45^1$ of the test chamber is formed with a projection 140 in the form of a rounded protrusion which biases the flexible lid of the container 3 inwardly when the cover 45 sealingly closes the test cavity. Thereby, the inside of the container 3 is additionally pressurized and especially the air remaining therein besides the filling product, and a critical part of the overall container, namely the lid at its bonded seam, is extremely loaded so that such area may be tested under a selectively increased stress during the installation of a pressure difference as described above with respect to the other embodiments.

While I have shown and described only several embodiments in accordance with the present invention, it is understood that the same is not limited thereto, but is susceptible to numerous changes and modifications as known to those skilled in the art. Therefore, I do not wish to be limited to details shown and described herein, but intend to cover all such changes and modifications as are encompassed by the scope of the appended claims.

I claim:

1. A method of leak testing a container with a flexible side wall comprising the steps of:

introducing the container into a test cavity so that said flexible side wall of said container is spaced from at least first, relatively recessed portions of an adjacent inner wall of said test cavity with a gap being defined between at least said first, relatively recessed portions of said inner wall of said test cavity and said flexible side wall of said container;

installing a pressure difference as an initial value between the interior of said container and at least said gap by applying a pressure at least to said gap which is smaller than a pressure inside said container;

mechanically stabilizing said flexible side wall with respect to outward bending as a result of said pressure difference by supporting said flexible side wall from its exterior side within said test cavity on second, relatively raised portions of said adjacent inner wall of said test cavity; and measuring the time course of a pressure prevailing within said gap as a leak indicative signal.

2. The method according to claim 1, including forming a plurality of channels in said inner adjacent wall of said test cavity to form said first, relatively recessed portions.

3. The method according to claim 1, including blasting said inner adjacent wall of said test cavity with objects, of particulate matter to roughen the surface thereof to form at least some of said first, relatively recessed portions and second, relatively raised portions.

4. The method according to claim 1, where said container is introduced into said cavity so that said flexible side wall of said container is spaced from both said first, relatively recessed portions of said inner adjacent wall of said test cavity and said second, relatively raised portions of said adjacent inner wall.

5. A test chamber for leak testing a container with a flexible side wall, said test chamber comprising:
- a closable test cavity with an inner wall within which a container to be leak tested can be positioned such that a flexible side wall of the container is spaced from at least first, relatively recessed portions of an adjacent portion of said inner wall;
- means for controllably reducing pressure within said cavity;
- means for measuring pressure within said cavity; and
- wherein said adjacent portion of said inner wall of said test cavity further comprises second, relatively raised portions for supporting said flexible side wall of the container with respect to outward bending as a result of a reduced pressure within said cavity with respect to pressure within said container.

6. The test chamber according to claim 5, wherein said first, relatively recessed portions include a plurality of channels in said inner adjacent portion of said inner wall.

7. The test chamber according to claim 6, wherein said adjacent portion of said inner wall between said channels includes a roughened wall surface with relatively raised portions thereof forming at least some of said second, relatively raised portions and relatively recessed portions thereof forming at least some of said first, relatively recessed portions.

8. The test chamber according to claim 5, wherein said adjacent portion of said inner wall includes a roughened wall surface with relatively raised portions thereof forming at least some of said second, relatively raised portions and relatively recessed portions thereof forming at least some of said first, relatively recessed portions.

9. A test machine for in-line leak testing of containers having a flexible side wall after their filling and their closing, comprising:
- a multitude of closeable test cavities for introducing respective ones of said closed and filled containers;
- means for installing a pressure difference as an initial value between the inside of said container and the remaining volume of respective ones of said test cavities once respective containers are introduced in said respective cavities, said pressure difference being such that the pressure in said remaining volume of said respective cavities is smaller than a pressure inside said containers;
- means for measuring pressure within said test cavities; and
- a plurality of relatively raised portions provided on an inner wall of each of said test cavities for supporting the flexible side wall of the container therein at least when said pressure difference is installed.

10. The test machine according to claim 9, wherein said means for installing includes a projection on a wall of each of said test cavities which biases a flexible lid of the container in the corresponding test cavity inwardly, to effect a higher pressure upon the contents of said containers.

11. The test machine according to claim 10, wherein each of said projections is located on an inner wall of a cover for its corresponding test cavity.

12. The test machine according to claim 9, wherein said means for installing includes means for applying a pressure to said remaining volume of said respective cavities which is smaller than a pressure inside said containers.

13. A test chamber for leak testing of a container, said container having a cross-sectional area diminishing along the direction of a traverse axis through said container, said test chamber comprising:
- a closeable test cavity for receiving said container, said cavity being formed by a receptacle, the open cross-sectional area thereof diminishing in direction towards the bottom of said receptacle and comprising a cover for tightly closing said receptacle;
- means for installing a pressure difference as an initial value between the inside of said container and the remaining volume of said test cavity, once said container is introduced thereon;
- means for measuring a pressure value being dependent from said pressure difference installed and from leakage of said container;
- whereby the shape of said cavity being at least substantially geometrically similar to the shape of said container, so as to minimize said remaining volume, and whereby said means for installing and said means for measuring communicate with said remaining volume so as to test a closed container without destroying its closed integrity and wherein said cover includes a projection on an inner wall thereof which biases a flexible lid of a container in the closed test cavity to pressurize the contents of said container.

14. A method of leak testing a container with a flexible wall portion comprising the steps of:
- introducing the container into a test cavity so that said flexible wall portion of said container is spaced from at least first, relatively recessed portions of an adjacent inner wall of said test cavity with a gap being defined between at least said first, relatively recessed portions of said inner wall of said test cavity and said flexible wall portion of said container;
- installing a pressure difference as an initial value between the interior of said container and at least said gap by applying a pressure at least to said gap which is smaller than a pressure inside said container;
- mechanically stabilizing said flexible wall portion with respect to outward bending as a result of said pressure difference by supporting said flexible wall portion from its exterior side within said test cavity on second, relatively raised portions of said adjacent inner wall of said test cavity; and
- measuring a signal dependent on change of said pressure difference as a leak indicative signal.

15. The method according to claim 14, including forming a plurality of channels in said adjacent inner wall of said test cavity to form said first, relatively recessed portions.

16. The method according to claim 14, including forming said relatively recessed portions and said relatively raised portions by shape-setting a distinct pattern of said portions in said inner wall.

17. The method according to claim 14, including blasting said inner adjacent wall of said test cavity with objects of particulate matter to roughen the surface thereof to form at least some of said first, relatively recessed portions and second, relatively raised portions.

18. The method according to claim 14, including forming said relatively recessed portions and said relatively raised portions by chafing or sanding said inner adjacent wall of said test cavity with abrasive material to effect a predetermined surface roughness of said wall.

19. The method according to claim 14, wherein said container is introduced into said cavity so that said flexible wall portion of said container is spaced from both said first, relatively recessed portions and said second, relatively raised portions of said adjacent inner wall of said test cavity.

20. The method according to claim 14, including mechanically biasing the container from the outside to the inside by contacting the flexible wall portion projecting with a body when the container is inside said test cavity to increase the pressure inside of said container.

21. The method according to claim 20, wherein said test cavity is defined by at least first and second members, a projection being provided on at least one of said first and second members, and mechanically biasing further inwardly flexible wall portions of said container with said projection when said test cavity is closed.

22. A test chamber for leak testing a container with a flexible wall portion, said test chamber comprising:
   a closable test cavity with an inner wall within which a container to be leak tested can be positioned such that a flexible wall portion of the container is spaced from at least first, relatively recessed portions of an adjacent portion of said inner wall;
   means for controllably reducing pressure within said cavity;
   means for measuring pressure within said cavity; and
   wherein said adjacent portion of said inner wall of said test cavity further comprises second, relatively raised portions for supporting said flexible wall portion of the container with respect to outward bending as a result of a reduced pressure within said cavity with respect to pressure within said container.

23. The test chamber according to claim 22, wherein said first, relatively recessed portions include a plurality of channels in said inner adjacent portion of said inner wall.

24. The test chamber according to claim 23, wherein said adjacent portion of said inner wall between said channels includes a roughened wall surface with relatively raised portions thereof forming at least some of said second, relatively raised portions, and relatively recessed portions thereof forming at least some of said first, relatively recessed portions.

25. The test chamber according to claim 22, wherein said first relatively recessed portions and said second relatively raised portions are formed by a geometrically distinct pattern machined into said inner wall.

26. The test chamber according to claim 22, wherein said adjacent portion of said inner wall includes a roughened wall surface with relatively raised portions thereof forming at least some of said second, relatively raised portions, and relatively recessed portions thereof forming at least some of said first, relatively recessed portions.

27. The test chamber according to claim 22, wherein said inner wall of said test cavity includes a projection which mechanically biases inwardly a further flexible wall portion of the container in the test cavity inwardly, to effect a higher pressure upon the contents of said container.

28. The test chamber according to claim 27, wherein said projection biases said further flexible wall portion of said container as said test cavity is closed.

29. The test chamber according to claim 27, wherein said flexible wall portion and said further flexible wall portion are formed by separate parts of the wall of said container linked together, and that said link between separate wall parts is mechanically test-loaded by said biasing as said outward bending is stabilized.

30. A test machine for in-line leak testing of closed and filled containers having a flexible wall portion after their filling and their closing, comprising:

a multitude of closeable test cavities for introducing respective ones of said closed and filled containers;

means for installing a pressure difference as an initial value between the inside of said container and the remaining volume of respective ones of said multitude of test cavities once respective containers are also introduced in their associated test cavities, said pressure difference being such that the pressure in said remaining volume of said respective cavities is smaller than a pressure inside said containers;

means for measuring pressure within said test cavities; and a plurality of relatively raised portions provided on an inner wall of each of said multitude of test cavities for supporting the flexible wall portions of the respective ones of said container therein at least when said pressure difference is installed.

31. The test machine according to claim 30, wherein said means for installing includes means for applying a pressure to said remaining volume of said respective cavities which is smaller than a pressure inside associated ones of said containers.

32. A test chamber for leak testing of a container, said container having a cross-sectional area diminishing along the direction of an axis through said container, said test chamber comprising:
   a closeable test cavity for receiving said container, said cavity being formed by a receptacle, the open cross-sectional area thereof diminishing in a direction towards the bottom of said receptacle and comprising a cover for tightly closing said receptacle;
   means for installing a pressure difference as an initial value between the inside of said container and the remaining volume of said test cavity, once said container is introduced thereon;
   means for measuring a pressure value being dependent from said pressure difference installed and from leakage of said container;
   whereby the shape of said cavity being at least substantially geometrically similar to the shape of said container, so as to minimize said remaining volume, and whereby said means for installing and said means for measuring communicate with said remaining volume so as to test a closed container without destroying its closed integrity and wherein said cover includes a projection on an inner wall thereof which mechanically biases inwardly a flexible wall portion of a container in the closed test cavity to pressurize the contents of said container.

33. A method of leak testing a container with a flexible wall portion comprising the steps of:
   introducing the container into a test cavity so that said flexible wall portion of said container is spaced via a gap from at least a portion of an adjacent inner wall of said test cavity;
   installing a pressure difference as an initial value between the interior of said container and at least said gap by applying a pressure at least to said gap which is smaller than a pressure inside said container;
   mechanically stabilizing said flexible wall portion with respect to outward bending as a result of said pressure difference by mechanically supporting said flexible wall portion from its exterior side within said test cavity; and measuring a signal dependent on change in said pressure difference as a leak indicative signal; and wherein said method includes the step of mechanically biasing the container in said test cavity from the outside to the inside of said container to increase the pressure inside the container.

34. The method according to claim 33, wherein the shape of said test cavity is at least substantially geometrically similar to the shape of said container so as to minimize the volume remaining between said container and adjacent to the inner wall of the test cavity when the container is introduced into said test cavity.

* * * * *